(12) United States Patent
Nishio

(10) Patent No.: US 7,622,872 B2
(45) Date of Patent: Nov. 24, 2009

(54) ACTUATOR DRIVING APPARATUS

(75) Inventor: Masahiro Nishio, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/781,689

(22) Filed: Jul. 23, 2007

(65) Prior Publication Data

US 2007/0262736 A1 Nov. 15, 2007

Related U.S. Application Data

(63) Continuation of application No. 10/853,672, filed on May 25, 2004, now Pat. No. 7,262,567.

(30) Foreign Application Priority Data

May 28, 2003 (JP) ............................. 2003-151093

(51) Int. Cl.
*H02K 33/00* (2006.01)
*H02P 1/00* (2006.01)
(52) U.S. Cl. ..................... 318/127; 318/119; 310/36; 310/316.01; 331/4
(58) Field of Classification Search ................. 318/127, 318/119; 310/36, 316.01; 331/4
See application file for complete search history.

(56) References Cited

U.S. PATENT DOCUMENTS

| 4,879,528 A | 11/1989 | Gotanda |
|---|---|---|
| 4,965,532 A | 10/1990 | Sakurai |
| 5,124,796 A | 6/1992 | Maki |
| 5,136,199 A | 8/1992 | Kawai |
| 5,296,757 A | 3/1994 | Koizumi |

FOREIGN PATENT DOCUMENTS

| EP | 0 412 852 B1 | 3/1997 |
|---|---|---|
| JP | 62-52282 | 11/1987 |
| JP | 2002-277809 | 9/2002 |

OTHER PUBLICATIONS

Wenzel, C., "Unusual Frequency Dividers", Wenzel.com, Sep. 11, 1995, Wenzel Associates, Mar. 21, 2006 <http:///www.wenzel.com/pdffiles/dividers.pdf>.

*Primary Examiner*—Stephen W Jackson
*Assistant Examiner*—Scott Bauer
(74) *Attorney, Agent, or Firm*—Scully, Scott, Murphy & Presser, P.C.

(57) ABSTRACT

An actuator driving apparatus comprises the following. A start signal generator generates a start signal having a frequency substantially equal to the resonance frequency of the movable portion of an actuator. A rock detector detects rock of the movable portion. A drive timing signal generator generates a drive timing signal based on the output of the rock detector. A switch is connected to the start signal generator and drive timing signal generator for selectively transmitting their outputs to a section arranged in a subsequent stage. A drive signal generator generates a drive signal based on the output of the switch, and supplies it to the actuator. A superposition preventing section prevents a frequency component of a frequency substantially equal to the resonance frequency from being superposed upon the output of the rock detector. The apparatus performs driving according to the rocking state of the movable portion, by switching the switch.

4 Claims, 3 Drawing Sheets

ACTUATOR DRIVING APPARATUS

CROSS-REFERENCE TO RELATED APPLICATIONS

This application is a continuation application of U.S. application Ser. No. 10/853,672 filed May 25, 2004, which is based upon and claims the benefit of priority from prior Japanese Patent Application No. 2003-151093, filed May 28, 2003, the entire contents of each of which are incorporated herein by reference.

BACKGROUND OF THE INVENTION

1. Field of the Invention

The present invention relates to an actuator driving apparatus.

2. Description of the Related Art

Actuator driving apparatuses that operate at a resonance frequency are well known. For example, Jpn. Pat. Appln. KOKOKU Publication No. 62-52282 discloses an actuator driving apparatus described below.

FIG. 6 shows a conventional actuator driving apparatus. As shown, an actuator driving apparatus 20 for driving an actuator 1 comprises a power supply circuit 2, start signal generating circuit 3, switch circuit 4, drive signal generating circuit 5, start control circuit 6, timing signal generating circuit 7 and rock detection circuit 8. The actuator 1 is connected to the drive signal generating circuit 5 and rock detection circuit 8.

The power supply circuit 2 supplies power to each of the above-mentioned circuits of the actuator driving apparatus 20 via power supply lines (indicated by the broken lines in the figure). The rock detection circuit 8 extracts a detection signal from, for example, a signal indicating an electromotive force and generated during the rock motion of the actuator 1. The timing signal generating circuit 7 generates a drive timing signal based on the detection signal from the rock detection circuit 8. The start signal generating circuit 3 generates a start signal of substantially the same frequency as the resonance frequency of the actuator 1.

The switch circuit 4 outputs either the start signal supplied from the start signal generating circuit 3 or the drive timing signal supplied from the timing signal generating circuit 7, based on a switch control signal described later. The drive signal generating circuit 5 generates a drive signal based on the output signal of the switch circuit 4, and supplies it to the actuator 1. The start control circuit 6 generates the above-mentioned switch control signal.

The operation of the above-described structure will be described. At the initial stage of actuator driving, a switch control signal is output from the start control circuit 6, and the switch circuit 4 is ready to output the start signal supplied from the start signal generating circuit 3. The start signal has a frequency close to the resonance frequency of the movable portion of the actuator 1. The drive signal generating circuit 5 generates a drive signal in accordance with the start signal as the output of the switch circuit 4, and supplies it to the actuator 1. Since the drive signal has a frequency close to the resonance frequency of the movable portion of the actuator 1, the actuator 1 is activated to rock, and the rock angle of the actuator 1 is gradually increased.

The rock detection circuit 8 acquires information concerning the rock motion of the actuator 1, and outputs a detection signal. When the amplitude of the detection signal exceeds a preset value, the start control circuit 6 stops the output of the switch control signal to switch the switch circuit 4. The timing signal generating circuit 7 outputs a drive timing signal that has the same frequency as the detection signal supplied from the rock detection signal 8, and has its phase adjusted in accordance with the detection signal. The switch circuit 4 outputs the timing signal that is supplied from the timing signal generating circuit 7. The drive signal generating circuit 5 generates a drive signal in accordance with the drive timing signal, and supplies it to the actuator 1.

As stated above, at the initial stage of the starting operation, the actuator 1 is forcibly driven by substantially the same frequency as the resonance frequency of the movable portion of the actuator 1, therefore can reliably be started. When the rock amplitude of the actuator 1 exceeds a predetermined value, a self-oscillation circuit is formed based on the rock detection signal of the actuator 1, thereby performing driving at the resonance frequency.

BRIEF SUMMARY OF THE INVENTION

According to a first aspect of the invention, there is provided an actuator driving apparatus comprising:

a start signal generating section which generates a start signal having a frequency substantially equal to a resonance frequency of a movable portion of an actuator;

a rock detecting section which detects rock of the movable portion of the actuator;

a drive timing signal generating section which generates a drive timing signal based on an output of the rock detecting section;

a switch section connected to the start signal generating section and the drive timing signal generating section, the switch section selectively transmitting outputs of the start signal generating section and the drive timing signal generating section to a section arranged in a subsequent stage;

a drive signal generating section which generates a drive signal based on an output of the switch section, and supplies the drive signal to the actuator; and a superposition preventing section which prevents a frequency component having a frequency substantially equal to the resonance frequency of the movable portion from being superposed upon a detection signal output from the rock detecting section, wherein a driving operation is performed in accordance with a rocking state of the movable portion of the actuator, by switching the output of the switch section.

Preferably, the superposition preventing section stops an operation of the start signal generating section when the switch section outputs the drive timing signal.

More preferably, the superposition preventing section is provided across a first power supply line used to supply power to the start signal generating section, the superposition preventing section disconnecting the first power supply line when the switch section outputs the drive timing signal.

Yet preferably, the superposition preventing section is a filter circuit provided across the first power supply line.

Also preferably, the superposition preventing section is a filter circuit provided across a second power supply line used to supply power to the rock detecting section.

Preferably, the superposition preventing section is a filter circuit provided across a second power supply line used to supply power to the rock detecting section.

Further preferably, the superposition preventing section is a filter circuit provided across a second power supply line used to supply power to the rock detecting section.

According to a second aspect of the invention, there is provided an actuator driving apparatus comprising:

a start signal generating section which generates a start signal having a frequency substantially equal to a resonance frequency of a movable portion of an actuator;

a rock detecting section which detects rock of the movable portion of the actuator;

a drive timing signal generating section which generates a drive timing signal based on an output of the rock detecting section;

a switch section connected to the start signal generating section and the drive timing signal generating section, the switch section selectively transmitting outputs of the start signal generating section and the drive timing signal generating section to a section arranged in a subsequent stage; and a drive signal generating section which generates a drive signal based on an output of the switch section, and supplies the drive signal to the actuator, wherein:

a driving operation is performed in accordance with a rocking state of the movable portion of the actuator, by switching the output of the switch section; and the start signal generating section includes an oscillation circuit and a divider, the oscillation circuit generating a signal having a frequency higher the resonance frequency of the movable portion of the actuator, the divider dividing an output of the oscillation circuit, the start signal generating section preventing, using the oscillation circuit and the divider, a frequency component having a frequency substantially equal to the resonance frequency of the movable portion from being superposed upon a detection signal output from the rock detecting section.

Preferably, a filter circuit is provided after the rock detecting section, the filter circuit removing a signal, generated by the oscillation circuit, from a detection signal output from the rock detecting section.

According to a third aspect of the invention, there is provided an actuator driving apparatus comprising:

a start signal generating section which generates a start signal having a frequency substantially equal to a resonance frequency of a movable portion of an actuator;

a rock detecting section which detects rock of the movable portion of the actuator;

a drive timing signal generating section which generates a drive timing signal based on an output of the rock detecting section;

a switch section connected to the start signal generating section and the drive timing signal generating section, the switch section selectively transmitting outputs of the start signal generating section and the drive timing signal generating section to a section arranged in a subsequent stage;

a drive signal generating section which generates a drive signal based on an output of the switch section, and supplies the drive signal to the actuator;

a first power supply section which supplies power to the start signal generating section; and a second power supply section which supplies power to the rock detecting section, wherein:

a driving operation is performed in accordance with a rocking state of the movable portion of the actuator, by switching the output of the switch section; and the first power supply section and the second power supply section are electrically independent of each other such that a frequency component having a frequency substantially equal to the resonance frequency of the movable portion is prevented from being superposed upon a detection signal output from the rock detecting section.

According to a fourth aspect of the invention, there is provided an actuator driving apparatus comprising:

start signal generating means for generating a start signal having a frequency substantially equal to a resonance frequency of a movable portion of an actuator;

rock detecting means for detecting rock of the movable portion of the actuator;

drive timing signal generating means for generating a drive timing signal based on an output of the rock detecting means;

switch means connected to the start signal generating means and the drive timing signal generating means, the switch means selectively transmitting outputs of the start signal generating means and the drive timing signal generating means to means arranged in a subsequent stage;

drive signal generating means for generating a drive signal based on an output of the switch means, and supplies the drive signal to the actuator; and superposition preventing means for preventing a frequency component having a frequency substantially equal to the resonance frequency of the movable portion from being superposed upon a detection signal output from the rock detecting means, wherein a driving operation is performed in accordance with a rocking state of the movable portion of the actuator, by switching the output of the switch means.

Preferably, the superposition preventing means stops an operation of the start signal generating means when the switch means outputs the drive timing signal.

Also preferably, the superposition preventing means is provided across a first power supply line used to supply power to the start signal generating means, the superposition preventing means disconnecting the first power supply line when the switch means outputs the drive timing signal.

More preferably, the superposition preventing means is filter means provided across the first power supply line.

Preferably, the superposition preventing means is filter means provided across a second power supply line used to supply power to the rock detecting means.

Preferably, the superposition preventing means is filter means provided across a second power supply line used to supply power to the rock detecting means.

Yet preferably, the superposition preventing means is filter means provided across a second power supply line used to supply power to the rock detecting means.

Preferably, the start signal generating means includes oscillation means and divider means, the oscillation means generating a signal having a frequency higher the resonance frequency of the movable portion of the actuator, the divider means dividing an output of the oscillation means, the start signal generating means functioning as the superposition preventing means.

Also preferably, filter means is provided after the rock detecting means, the filter means removing a signal, generated by the oscillation means, from a detection signal output from the rock detecting means.

According to a fifth aspect of the invention, there is provided an actuator driving apparatus comprising:

start signal generating means for generating a start signal having a frequency substantially equal to a resonance frequency of a movable portion of an actuator;

rock detecting means for detecting rock of the movable portion of the actuator;

drive timing signal generating means for generating a drive timing signal based on an output of the rock detecting means;

switch means connected to the start signal generating means and the drive timing signal generating means, the switch means selectively transmitting outputs of the start signal generating means and the drive timing signal generating means to means arranged in a subsequent stage;

drive signal generating means for generating a drive signal based on an output of the switch means, and supplies the drive signal to the actuator;

first power supply means for supplying power to the start signal generating means; and second power supply means for supplying power to the rock detecting means, the second power supply means being electrically independent of the first power supply means, wherein:

a driving operation is performed in accordance with a rocking state of the movable portion of the actuator, by switching the output of the switch means; and the first power supply means and the second power supply means cooperate to function as superposition preventing means.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

Embodiments of the invention will be described in detail with reference to the accompanying drawings.

First Embodiment

Figure 1:
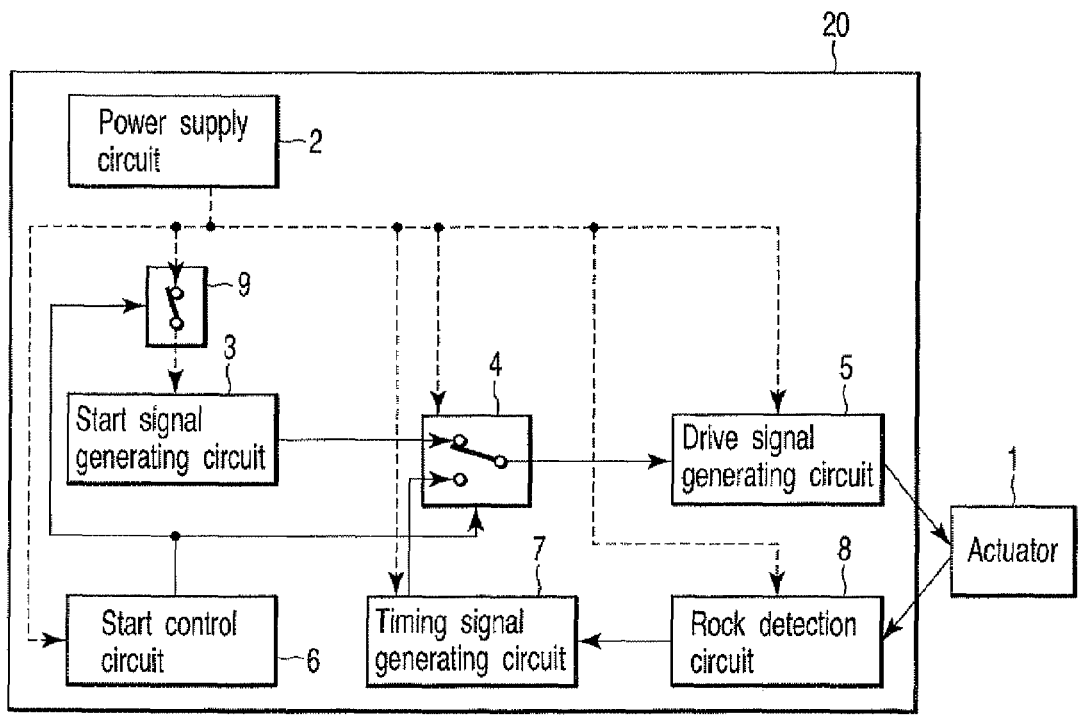
FIG. 1 is a block diagram illustrating the configuration of an actuator driving apparatus 20 according to a first embodiment of the invention.

FIG. 1 is a block diagram illustrating the configuration of an actuator driving apparatus 20 according to a first embodiment of the invention. The actuator driving apparatus 20 is a circuit for driving an actuator 1. The apparatus 20 comprises a power supply circuit 2, start signal generating circuit 3, switch circuit 4, drive signal generating circuit 5, start control circuit 6, timing signal generating circuit 7 as a section for generating a drive timing signal, rock detection circuit 8, and power supply control circuit 9 as superimposition preventing means.

The power supply circuit 2 supplies power to each of the above-mentioned circuits of the actuator driving apparatus 20 via power supply lines (indicated by the broken lines in the figure). The rock detection circuit 8 extracts a detection signal from, for example, a signal indicating an electromotive force and generated during the rock motion of the actuator 1. The timing signal generating circuit 7 generates a drive timing signal based on the detection signal from the rock detection circuit 8. The start signal generating circuit 3 generates a start signal of substantially the same frequency as the resonance frequency of the actuator 1.

The switch circuit 4 performs switching in the following manner. When a switch control signal, described later, is output, the circuit 4 supplies the drive signal generating circuit 5 with a start signal from the start signal generating circuit 3. On the other hand, when the switch control signal is not output, the circuit 4 supplies the drive signal generating circuit 5 with a drive timing signal from the timing signal generating circuit 7.

The drive signal generating circuit 5 generates a drive signal based on the output signal of the switch circuit 4, and supplies it to the actuator 1. The switch control signal is output from the start control circuit 6 and used for controlling the switching of the switch circuit 4 and for controlling the connection and disconnection of the power supply control circuit 9. The start control circuit 6 outputs the switch control signal for a certain period during a starting operation, or until the amplitude of a detection signal output from the rock detection circuit 8 exceeds a predetermined value.

The power supply control circuit 9 is provided across a line (first power supply line) for supplying power from the power supply circuit 2 to the start signal generating circuit 3. The circuit is connected when a switch control signal is output from the start control circuit 6, and disconnected when no switch control signal is output from the start control circuit 6.

The operation of the above-described structure will now be described. At the initial stage of the driving operation of the actuator 1, since the start control circuit 6 outputs a switch control signal, the power supply control circuit 9 is connected, and the switch circuit 4 is ready to output the start signal supplied from the start signal generating circuit 3. The start signal has a frequency close to the resonance frequency of the actuator, and the drive signal generating circuit 3 generates a drive signal in accordance with the start signal as the output of the switch circuit 4, and supplies it to the actuator 1. Since the drive signal has a frequency close to the resonance frequency of the movable portion (not shown) of the actuator 1, the actuator 1 is activated to rock, and the rock angle of the actuator 1 is gradually increased.

After a predetermined period or after it is determined, from a comparison concerning a detection signal output by the rock detection circuit 8, that the detection signal exceeds a predetermined level, the start control circuit 6 stops the output of the switch control signal. When the output is stopped after the predetermined period, this predetermined period is set so that during the period, the rock angle of the actuator 1 is increased to cause the detection signal to have a sufficient level for generating a drive timing signal.

Further, when the output is stopped depending upon the comparison result, a comparison as to whether the level of the detection signal is sufficient for the generation of the drive timing signal is performed. The rock detection circuit 8 acquires information concerning the rock of the actuator 1, such as a rock speed signal or rock angle signal, and outputs a detection signal. The timing signal generating circuit 7 determines, from the detection signal, an optimal point in time at which a drive signal is applied, and outputs a drive timing signal.

When the supply of the switch control signal from the start control circuit 6 is stopped, the switch circuit 4 is switched so that the drive timing signal from the timing signal generating circuit 7 is supplied to the drive signal generating circuit 5. The drive signal generating circuit 5 generates a drive signal and supplies it to the actuator 1 in accordance with the drive timing signal. Further, when the supply of the switch control signal is stopped, the power supply control circuit 9 is disconnected, thereby interrupting the supply of power from the power supply circuit 2 to the start signal generating circuit 3. As a result, the operation of the start signal generating circuit 3 is stopped.

At the initial stage of a starting operation, the actuator 1 is forcibly driven by a frequency close to the resonance frequency of the movable portion of the actuator 1. Thus, the driving of the actuator 1 is reliably started even at the initial stage of the starting operation. Furthermore, after the rock detection circuit 8 becomes able to detect the rock of the actuator 1, a self-oscillation circuit is formed which utilizes a detection signal output from the rock detection circuit 8, thereby driving the actuator 1 using the resonance frequency of the movable portion of the actuator 1. At this time, since the start control circuit 6 is stopped, no change occurs in current of the start signal generating circuit 3, and therefore no noise signal is superposed upon the detection signal output from the rock detection circuit 8. This means that the detection signal accurately indicates the rocking state of the actuator 1, which enables optimal driving to be performed at a stable frequency.

Although in the first embodiment, the operation of the start signal generating circuit 3 is stopped by disconnecting the line for supplying power to the circuit 3, this structure may be modified such that the operation of the start signal generating circuit 3 is stopped by an external signal, and no control is performed on the power supply.

Second Embodiment

Figure 2:
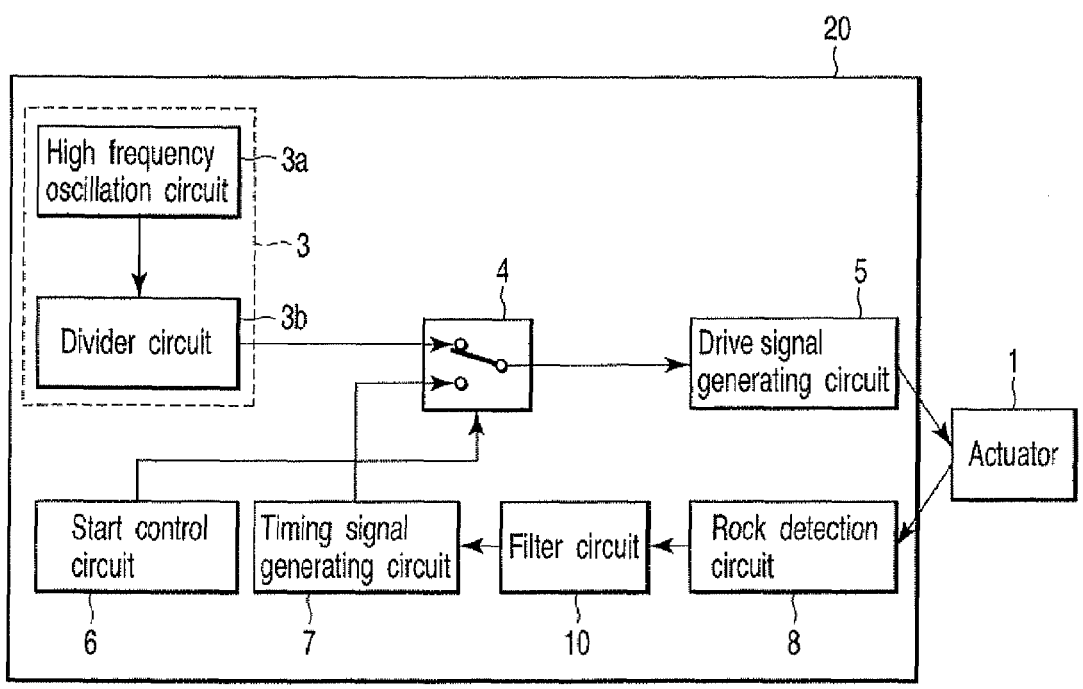
FIG. 2 is a block diagram illustrating the configuration of an actuator driving apparatus 20 according to a second embodiment of the invention.

FIG. 2 is a block diagram illustrating the configuration of an actuator driving apparatus 20 according to a second embodiment of the invention. The actuator driving apparatus 20 is a circuit for driving an actuator 1. The apparatus 20 comprises a power supply circuit (not shown), start signal generating circuit 3, switch circuit 4, drive signal generating circuit 5, start control circuit 6, timing signal generating circuit 7 as a section for generating a drive timing signal, rock detection circuit 8, and filter circuit 10. The start signal generating circuit 3 includes a high frequency oscillation circuit 3a and divider circuit 3b, which provide superposition preventing means.

The rock detection circuit 8 extracts a detection signal from, for example, a signal indicating an electromotive force and generated during the rock motion of the actuator 1. The filter circuit 10 is formed of a low-pass filter (LPF) or a band-pass filter (BPF) for removing frequency components higher than the resonance frequency of the movable portion of the actuator 1. The timing signal generating circuit 7 generates a drive timing signal based on a signal output from the filter circuit 10. The start signal generating circuit 3 generates a start signal of substantially the same frequency as the resonance frequency of the actuator 1.

The switch circuit 4 performs switching in the following manner. When a switch control signal, described later, is output, the circuit 4 supplies the drive signal generating circuit 5 with a start signal from the start signal generating circuit 3. On the other hand, when the switch control signal is not output, the circuit 4 supplies the drive signal generating circuit 5 with a drive timing signal from the timing signal generating circuit 7. The drive signal generating circuit 5 generates a drive signal based on the output signal of the switch circuit 4, and supplies it to the actuator 1.

The switch control signal is output from the start control circuit 6 and used to control the switching of the switch circuit 4. The start control circuit 6 outputs the switch control signal for a certain period during a starting operation, or until the amplitude of a detection signal output from the rock detection circuit 8 exceeds a predetermined value.

At the initial stage of the driving operation of the actuator 1, the actuator 1 is forcibly driven by a signal of a frequency close to the resonance frequency of the movable portion of the actuator 1. Therefore, the driving of the actuator 1 is reliably started even at the initial stage of the starting operation. Furthermore, after the rock detection circuit 8 becomes able to detect the rock of the actuator 1, a self-oscillation circuit is formed which utilizes a detection signal output from the rock detection circuit 8, thereby driving the actuator 1 using the resonance frequency of the movable portion of the actuator 1. The start signal generating circuit 3 outputs a start signal of substantially the same frequency as the resonance frequency of the movable portion of the actuator 1. Assuming that the resonance frequency is f, a start signal having a frequency of f is obtained by setting the frequency of the output signal of the high frequency oscillation circuit 3a to N×f, and setting the frequency division ratio of the divider circuit 3b to N ($N \geq 2$).

Accordingly, the frequency of a noise signal superposed upon a detection signal because of, for example, current fluctuation generated by the start signal generating circuit 3 becomes N×f. This significantly differs from the resonance frequency. Therefore, even if the noise signal is supplied to the rock detection circuit 8 via a power supply circuit (not shown), and superposed upon a detection signal output from the rock detection circuit 8, it is removed by the filter circuit 10 that removes a frequency component higher than the resonance frequency. As a result, the signal transmitted from the filter circuit 10 to the timing signal generating circuit 7 accurately indicates the rocking state of the actuator 1, which enables an appropriate driving operation to be performed at a reliable frequency.

In addition, even when at least the start signal generating circuit 3 is realized by software, using a microprocessor, if the operation frequency of, for example, the microprocessor is set to a value different from the above-mentioned resonance frequency, a noise signal generated by, for example, the microprocessor is removed by the filter circuit 10. As a result, the signal transmitted from the filter circuit 10 to the timing signal generating circuit 7 accurately indicates the rocking state of the actuator 1, which enables an appropriate driving operation to be carried out at a reliable frequency.

Third Embodiment

Figure 3:
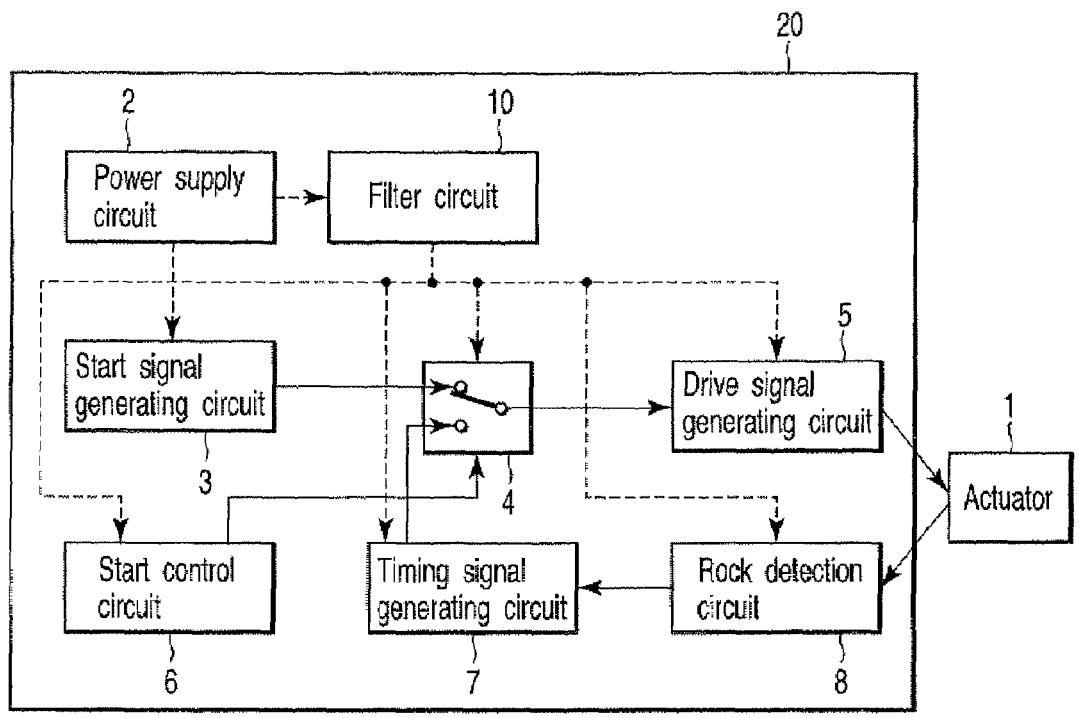
FIG. 3 is a block diagram illustrating the configuration of an actuator driving apparatus 20 according to a third embodiment of the invention.

FIG. 3 is a block diagram illustrating the configuration of an actuator driving apparatus 20 according to a third embodiment of the invention. The actuator driving apparatus 20 is a circuit for driving an actuator 1. The apparatus 20 comprises a power supply circuit 2, start signal generating circuit 3, switch circuit 4, drive signal generating circuit 5, start control circuit 6, timing signal generating circuit 7 as a section for generating a drive timing signal, rock detection circuit 8, and filter circuit 10 as superposition preventing means.

The power supply circuit 2 supplies power to each of the above-mentioned circuits of the actuator driving apparatus 20 via power supply lines (indicated by the broken lines in the figure). The circuit 2 includes a first power supply line for supplying power from the circuit 2 to the start signal generating circuit 3, and a second power supply line for supplying power from the circuit 2 to the circuits other than the start signal generating circuit 3.

The rock detection circuit 8 extracts a detection signal from, for example, a signal indicating an electromotive force and generated during the rock motion of the actuator 1. The timing signal generating circuit 7 generates a drive timing signal based on the detection signal output from the rock detection circuit 8. The start signal generating circuit 3 generates a start signal of a frequency close to the resonance frequency of the actuator 1.

The switch circuit 4 performs switching in the following manner. When a switch control signal, described later, is output, the circuit 4 supplies the drive signal generating circuit 5 with a start signal from the start signal generating circuit 3. On the other hand, when the switch control signal is not output, the circuit 4 supplies the drive signal generating circuit 5 with a drive timing signal from the timing signal generating circuit 7. The switch control signal is output from the start control circuit 6 and used to control the switching of the switch circuit 4. The start control circuit 6 outputs the switch control signal for a certain period during a starting operation, or until the amplitude of a detection signal output from the rock detection circuit 8 exceeds a predetermined value.

The filter circuit 10 is provided across the second power supply line for supplying power from the circuit 2 to the circuits other than the start signal generating circuit 3, and used to remove an AC signal containing a noise signal.

At the initial stage of the driving operation of the actuator 1, the actuator 1 is forcibly driven by a signal of a frequency close to the resonance frequency of the movable portion of the actuator 1. Therefore, the driving of the actuator 1 is reliably started even at the initial stage of the starting operation. Furthermore, after the rock detection circuit 8 becomes able to detect the rock of the actuator 1, a self-oscillation circuit is formed which utilizes a detection signal output from the rock detection circuit 8, thereby driving the actuator 1 using the resonance frequency of the movable portion of the actuator 1.

A noise signal, such as current fluctuation, generated by the start signal generating circuit 3 and transmitted to other circuits via the second power supply line and the first power supply line is removed by the filter circuit 10 provided across the second power supply line. Therefore, the noise signal is prevented from being superposed upon a detection signal output from the rock detection circuit 8. This means that the signal transmitted from the filter circuit 10 to the timing signal generating circuit 7 accurately indicates the rocking state of the actuator 1, which enables an appropriate driving operation to be performed at a reliable frequency.

In the third embodiment, the filter circuit 10 is provided across the second power supply line between the power supply circuit 2 and the circuits other than the start signal generating circuit 3. However, the same advantage can be acquired if the filter circuit 10 is provided across the first power supply line between the power supply circuit 2 and start signal generating circuit 3.

Fourth Embodiment

Figure 4:
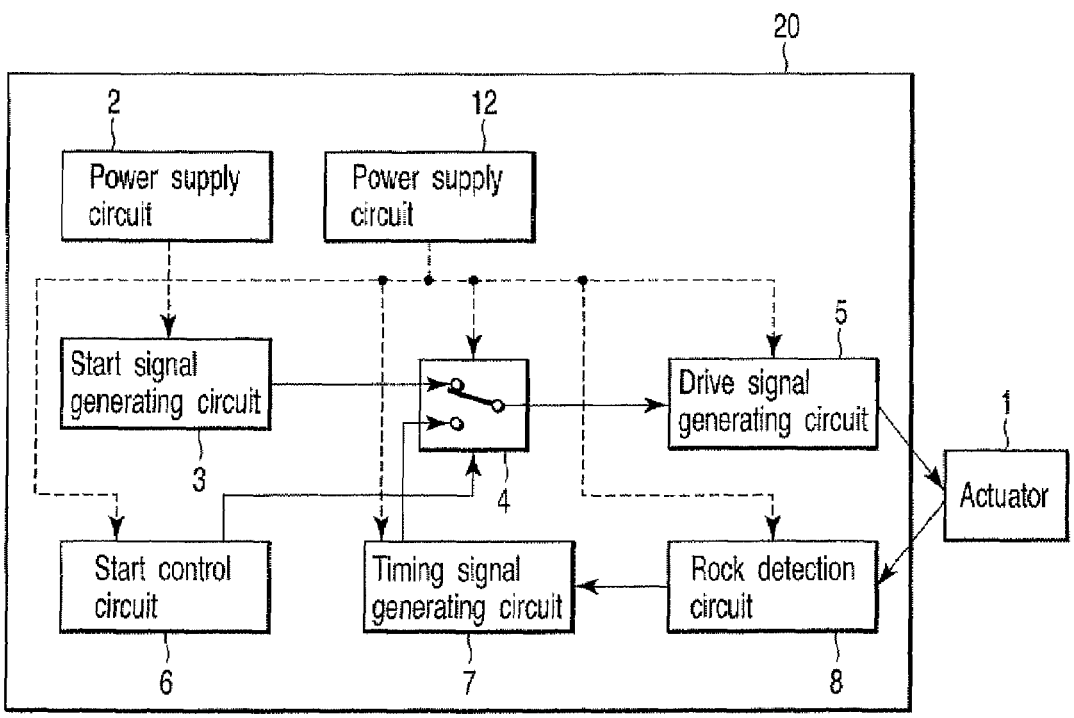
FIG. 4 is a block diagram illustrating the configuration of an actuator driving apparatus 20 according to a fourth embodiment of the invention.

FIG. 4 is a block diagram illustrating the configuration of an actuator driving apparatus 20 according to a fourth embodiment of the invention. The actuator driving apparatus 20 is a circuit for driving an actuator 1. The apparatus 20 comprises a power supply circuit 2 as a first power supply section, power supply circuit 12 as a second power supply section, start signal generating circuit 3, switch circuit 4, drive signal generating circuit 5, start control circuit 6, timing signal generating circuit 7, rock detection circuit 8, and filter circuit 10.

Figure 5:
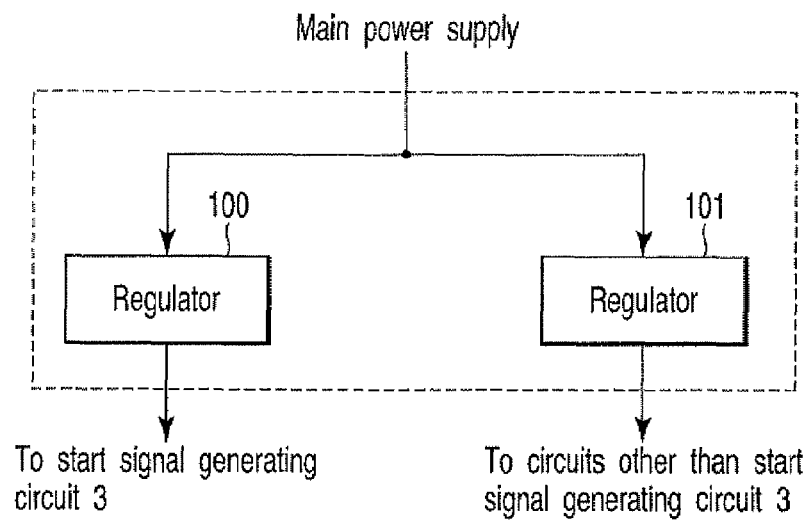
FIG. 5 is a block diagram illustrating a modification of the fourth embodiment.
Figure 6:
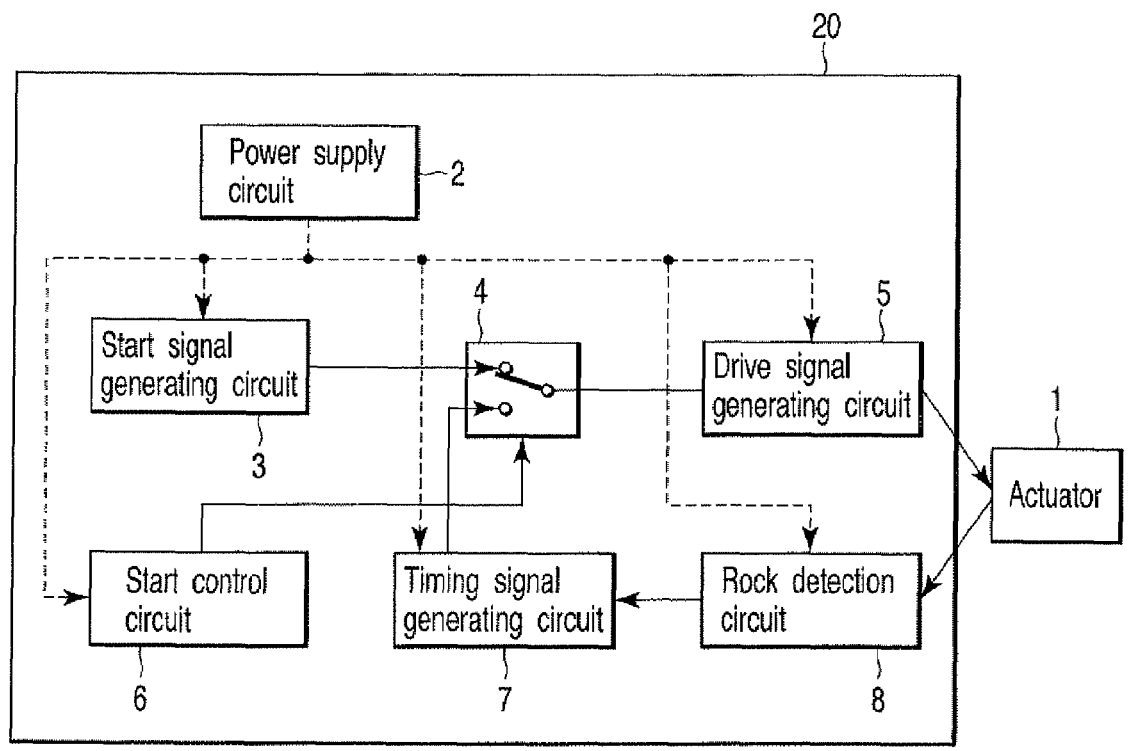
FIG. 6 is a block diagram illustrating a conventional actuator driving apparatus.

The power supply circuit 2 supplies power to the start signal generating circuit 3 via a first power supply line (indicated by a broken line in the figure). Similarly, the power supply circuit 12 supplies power to the circuits other than the start signal generating circuit 3 via a second power supply line (indicated by the other broken lines in the figure). Although in this embodiment, two separate power supply circuits 2 and 12 are provided, the structure as shown in FIG. 5 may be employed. In this case, the power supplied from a main power supply is divided into two branch lines, and regulators 100 and 101 are provided across the respective branch lines for supplying power to the start signal generating circuit 3 and to the circuits other than the start signal generating circuit 3.

The rock detection circuit 8 extracts a detection signal from, for example, a signal indicating an electromotive force and generated during the rock motion of the actuator 1. The timing signal generating circuit 7 generates a drive timing signal based on the detection signal output from the rock detection circuit 8. The start signal generating circuit 3 generates a start signal of a frequency close to the resonance frequency of the actuator 1.

The switch circuit 4 performs switching in the following manner. When a switch control signal, described later, is output, the circuit 4 supplies the drive signal generating circuit 5 with a start signal from the start signal generating circuit 3. On the other hand, when the switch control signal is not output, the circuit 4 supplies the drive signal generating circuit 5 with a drive timing signal from the timing signal generating circuit 7. The switch control signal is output from the start control circuit 6 and used to control the switching of the switch circuit 4. The start control circuit 6 outputs the switch control signal for a certain period during a starting operation, or until the amplitude of a detection signal output from the rock detection circuit 8 exceeds a predetermined value.

At the initial stage of the driving operation of the actuator 1, the actuator 1 is forcibly driven by a signal of a frequency close to the resonance frequency of the movable portion of the actuator 1. Therefore, the driving of the actuator 1 is reliably started even at the initial stage of the starting operation. Furthermore, after the rock detection circuit 8 becomes able to detect the rock of the actuator 1, a self-oscillation circuit is formed which utilizes a detection signal output from the rock detection circuit 8, thereby driving the actuator 1 using the resonance frequency of the movable portion of the actuator 1.

In the fourth embodiment, the first and second power supply lines are separate from each other. Accordingly, even when a noise signal, such as current fluctuation, generated by the start signal generating circuit 3 is transmitted to the first power supply line, it does not reach or influence the other circuits including the rock detection circuit 8 and connected to the second power supply line. This means that the signal transmitted from the filter circuit 10 to the timing signal generating circuit 7 accurately indicates the rocking state of the actuator 1, which enables an appropriate driving operation to be performed at a reliable frequency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An actuator driving apparatus comprising:
a start signal generating section which generates a start signal having a frequency substantially equal to a resonance frequency of a movable portion of an actuator;
a rock detecting section which detects rock of the movable portion of the actuator;
a drive timing signal generating section which generates a drive timing signal based on an output of the rock detecting section;
a switch section connected to the start signal generating section and the drive timing signal generating section, the switch section selectively transmitting outputs of the start signal generating section and the drive timing signal generating section to a section arranged in a subsequent stage;
a drive signal generating section which generates a drive signal based on an output of the switch section, and supplies the drive signal to the actuator; and
a superposition preventing section which stops an operation of the start signal generating section when the switch section outputs the drive timing signal to prevent a signal having a frequency approximately equal to the resonance frequency of the movable portion and is equal to the start signal from being superposed upon a detection signal output from the rock detecting section, the detection signal being equal to the resonance frequency of the movable portion,
wherein a driving operation is performed in accordance with a rocking state of the movable portion of the actuator, by switching the output of the switch section.

2. An actuator driving apparatus comprising:
start signal generating means for generating a start signal having a frequency substantially equal to a resonance frequency of a movable portion of an actuator;
rock detecting means for detecting rock of the movable portion of the actuator;
drive timing signal generating means for generating a drive timing signal based on an output of the rock detecting means;
switch means connected to the start signal generating means and the drive timing signal generating means, the switch means selectively transmitting outputs of the start signal generating means and the drive timing signal generating means to means arranged in a subsequent stage;
drive signal generating means for generating a drive signal based on an output of the switch means, and supplies the drive signal to the actuator; and
superposition preventing means for preventing a signal having a frequency approximately equal to the resonance frequency of the movable portion and is equal to the start signal from being superposed upon a detection signal output from the rock detecting means, the detection signal being equal to the resonance frequency of the movable portion,
wherein a driving operation is performed in accordance with a rocking state of the movable portion of the actuator, by switching the output of the switch means; and
wherein the superposition preventing means stops an operation of the start signal generating means when the switch means outputs the drive timing signal.

3. An actuator driving apparatus comprising:
start signal generating means for generating a start signal having a frequency substantially equal to a resonance frequency of a movable portion of an actuator;
rock detecting means for detecting rock of the movable portion of the actuator;
drive timing signal generating means for generating a drive timing signal based on an output of the rock detecting means;
switch means connected to the start signal generating means and the drive timing signal generating means, the switch means selectively transmitting outputs of the start signal generating means and the drive timing signal generating means to means arranged in a subsequent stage;
drive signal generating means for generating a drive signal based on an output of the switch means, and supplies the drive signal to the actuator; and
superposition preventing means for preventing a signal having a frequency approximately equal to the resonance frequency of the movable portion and is equal to the start signal from being superposed upon a detection signal output from the rock detecting means, the detection signal being equal to the resonance frequency of the movable portion,
wherein a driving operation is performed in accordance with a rocking state of the movable portion of the actuator, by switching the output of the switch means; and
wherein the start signal generating means includes oscillation means and divider means, the oscillation means generating a signal having a frequency higher the resonance frequency of the movable portion of the actuator, the divider means dividing an output of the oscillation means, the start signal generating means functioning as the superposition preventing means.

4. The actuator driving apparatus according to claim 3, further comprising filter means provided after the rock detecting means, the filter means removing a signal, generated by the oscillation means, from a detection signal output from the rock detecting means.

* * * * *